July 20, 1965 M. M. NICHOLSON 3,195,982
CONTINUOUS AUTOMATIC PROCESS CONTROL METHOD AND SYSTEM
Filed July 27, 1961 3 Sheets-Sheet 1

INVENTOR.
MARGIE M. NICHOLSON,
BY Frank S. Troidl
ATTORNEY.

INVENTOR.
MARGIE M. NICHOLSON,
BY Frank S. Troidl
ATTORNEY

United States Patent Office 3,195,982
Patented July 20, 1965

3,195,982
CONTINUOUS AUTOMATIC PROCESS CONTROL METHOD AND SYSTEM
Margie M. Nicholson, Baytown, Tex., assignor, by mesne assignments, to Esso Research and Engineering Company, Elizabeth, N.J., a corporation of Delaware
Filed July 27, 1961, Ser. No. 127,181
4 Claims. (Cl. 23—230)

This invention relates to automatic process controls. More particularly, this invention relates to systems and methods for controlling process variables such as the amount of fresh chemical added to process control streams.

In many processing systems, a continuous flow of liquid is utilized. The concentration of the substances in the liquid must be maintained within a certain predetermined range. One method of determining the concentration of hydrogen ion is by the conventional pH measurement. This is a direct determination. For other systems, however, the concentration must be evaluated indirectly through a titration procedure. The invention to be described herein is a continuous flow method and system useful for automatically controlling process variables such as the addition of fresh chemical to the fluid stream used in a process.

Briefly described, the method includes the step of potentiometrically titrating two sample portions from the process stream. The ratio of the amount of titrant to the amount of sample in one portion is more than the ratio of the amount of the titrant to the amount of sample in the other portion. A differential potentiometric cell is used to develop a differential potential as a result of the titration of the two sample portions. A control voltage which may be obtained, for example, from a battery is carefully chosen to lie on the shoulder of the titration curve. The total amounts of sample and titrant are continuously controlled to maintain a titration potential substantially equal in magnitude to the control voltage. Fresh chemical is continuously added to the process stream in response to changes in the concentration of sample, as measured by the equivalent amount of titrant which is used in the titration.

Briefly, the new system includes a titration cell having two spaced-apart identical electrodes. Means are provided for continuously flowing a sample portion of the process stream to the vicinity of each of the electrodes. Means are also provided for continuously flowing titrant to the vicinity of each of the electrodes. The ratio of sample to titrant flowed to the vicinity of one electrode is different from the ratio of sample to titrant flowed to the vicinity of the other electrode so that a potential difference is developed across the electrodes. An electrical circuit is included in the system for comparing the developed potential difference with a control voltage. If the potential difference varies from the control voltage, means responsive to a resulting current flow in the electrical circuit control the total amount of titrant flowed to the titration cell together with a fixed total amount of sample. Also, means are provided which are responsive to changes in the total titrant flow to control the amount of fresh material added to the process stream.

The invention as well as its many advantages will be further understood by reference to the following detailed description and drawings in which.

Figure 1:
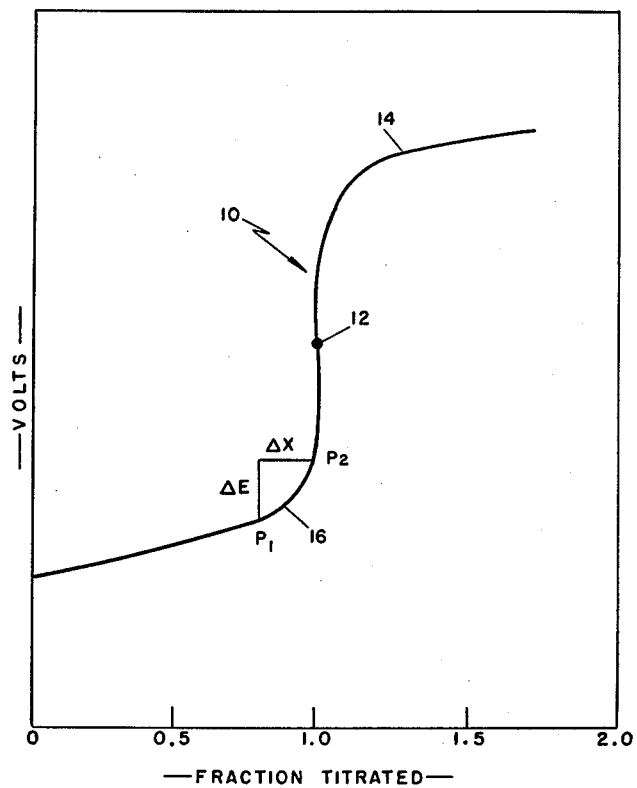
FIG. 1 is a typical titration curve useful in explaining the advantages and operation of the new system and method.

Referring to FIG. 1, a typical titration curve 10 is illustrated. The ordinate represents volts. The abscissa represents fraction titrated.

Three control regions may be designated for comparison:
 (1) At or near the equivalence point 12;
 (2) On a flat section 14 of the titration curve; and
 (3) On a shoulder 16 of the curve 10.

If the control setting is at the equivalence or inflection point 12, very precise control is obtained. However, undesirable "chattering" of the associated system occurs as it follows rapid fluctuations in potential. Hence, control at the equivalence point is impractical in a continuous control system.

If control is maintained on the flat section 14 of the titration curve, the response will be unsatisfactory due to lack of sensitivity.

The best and most practical control point for continuous control is on the shoulder 16 of the titration curve 10. A system for maintaining the control on the shoulder of the curve and for controlling the addition of fresh chemical to the process stream is illustrated in FIGS. 2 and 3.

Figure 2:
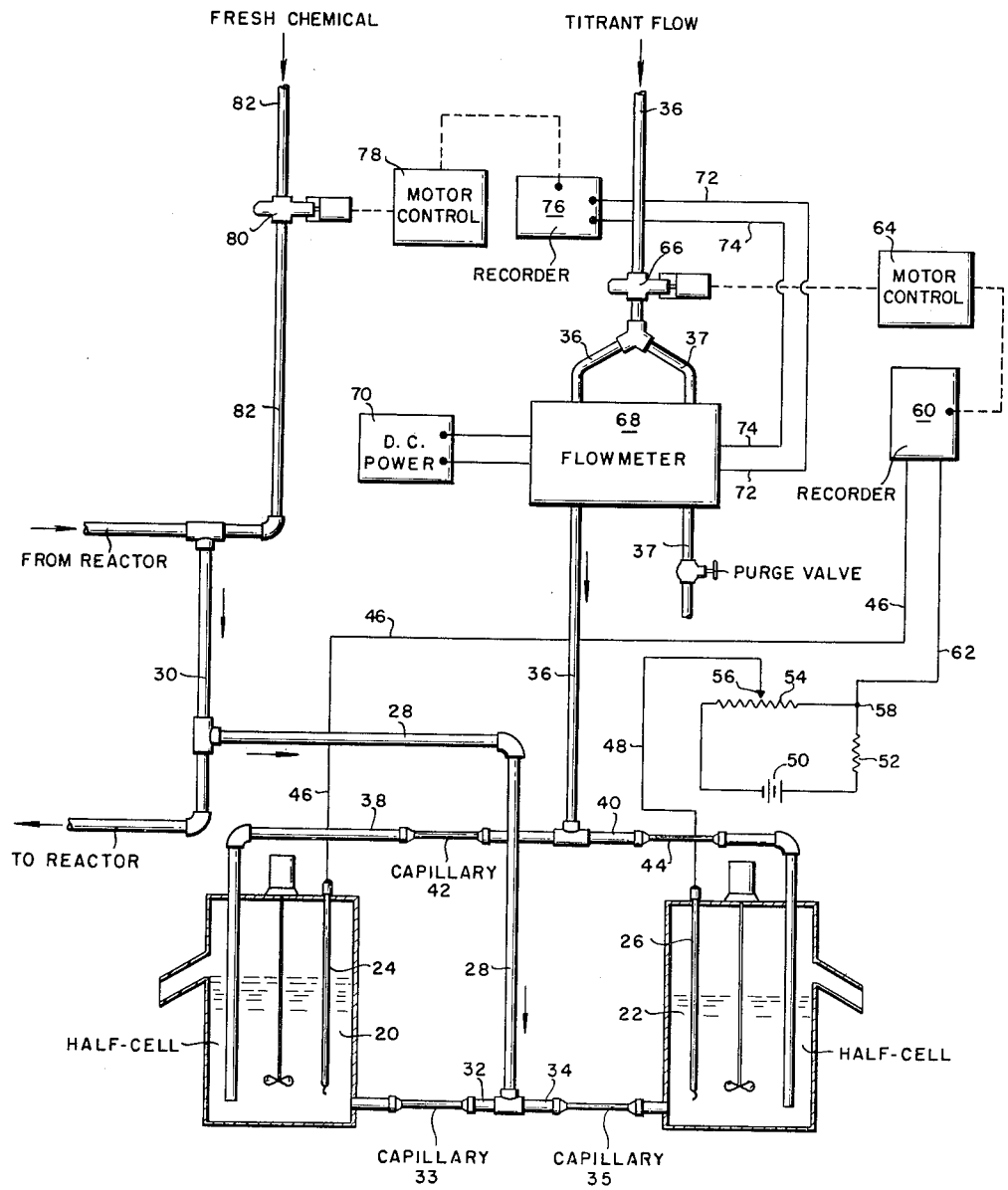
FIG. 2 is a schematic flow diagram partly in block form illustrating the method and system.
Figure 3:
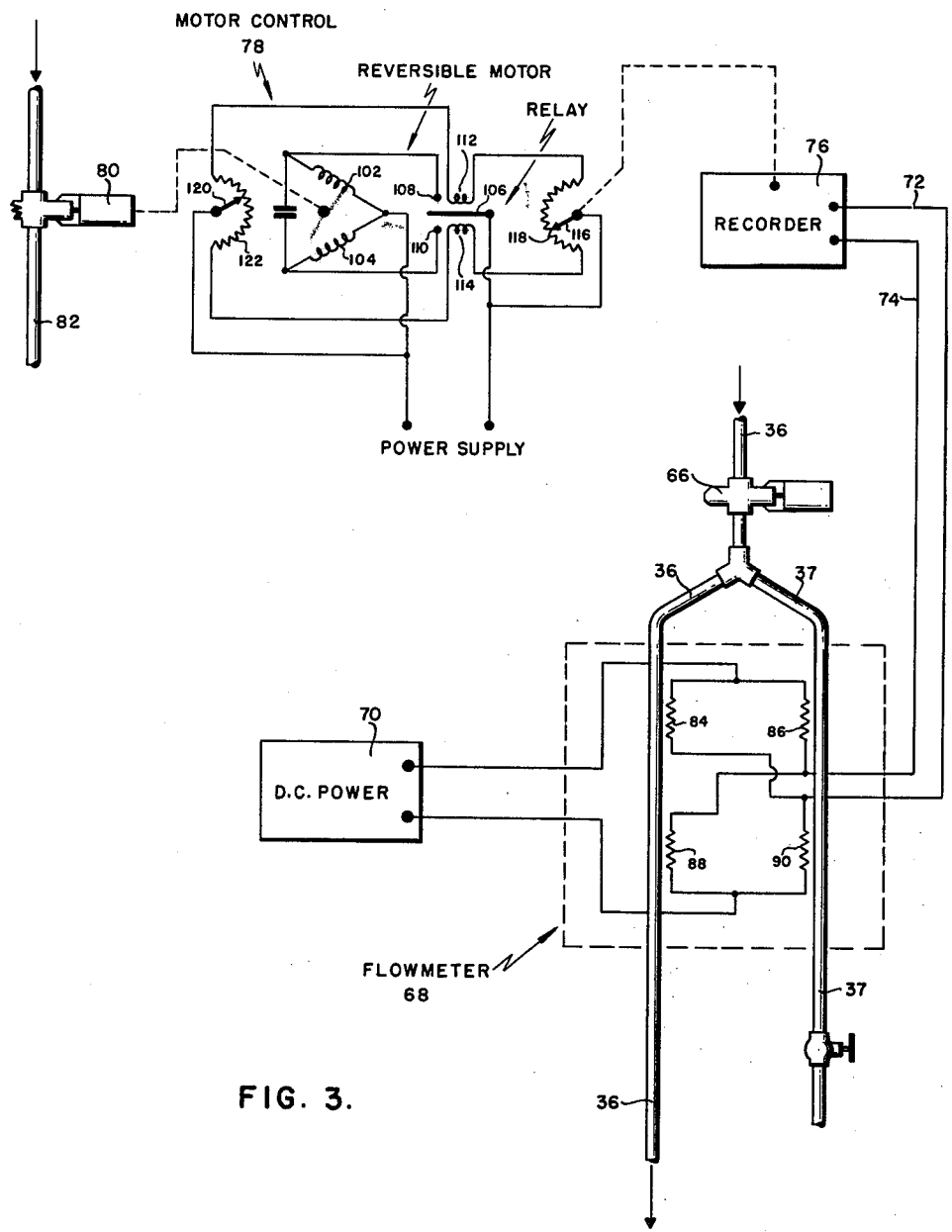
FIG. 3 is a schematic flow diagram and partly electrical schematic to show one type of electrical system useful in practicing the new method.

Referring specifically to FIG. 2, a titration cell consisting of a first half-cell 20 and a second half-cell 22 is shown. An electrode 24 and an electrode 26 are included in half-cell 20 and half-cell 22, respectively. Electrodes 24 and 26 are substantially identical in construction.

A sample line 28 leads from the process liquid stream line 30 to the titration cell. The sample line 28 branches into two identical lines 32 and 34. Branch line 32 leads to half-cell 20. Branch line 34 leads to half-cell 22. Lines 32 and 34 are illustrated in FIG. 2 as being adapted to flow half of the sample to half-cell 20 and half of the sample to half-cell 22. This is accomplished by the provision of capillaries 33 and 35 in lines 32 and 34, respectively. However, it is to be understood that, if desired, the relative amounts of sample fed to the half-cells may be differently proportioned.

A titrant flow system for continuously flowing titrant to each of the half-cells 20 and 22 is also included in the system. A main titrant flow line 36 branches into branch lines 38 and 40. Branch line 38 leads to half-cell 20. Branch line 40 leads to half-cell 22.

Capillaries 42 and 44 control the relative amounts of flow through branch line 38 and branch line 40, respectively. The capillaries 42 and 44 are sized so that a different amount of titrant is flowed to half-cell 20 when compared to the amount of titrant flowed to half-cell 22. Hence, a potential difference is developed across the electrodes 24 and 26.

The electrodes 24 and 26 are included in an electrical circuit having conductors 46 and 48 attached to electrodes 24 and 26, respectively. A control voltage is maintained by means of a battery 50 having its positive terminal connected to a resistor 52 and its negative terminal connected to a resistor 54. Line 48 leads to a voltage tap 56 in contact with resistor 54. The junction 58 of resistor 54 and resistor 52 is connected to a recorder 60 by way of line 62. Line 46 is also connected to recorder 60.

The recorder 60 is mechanically connected (indicated by the broken lines) to a motor control 64. Motor control 64 operates a valve 66. Valve 66 controls the total flow of titrant through titrant flow line 36.

A flowmeter 68 is located in the flow line 36 downstream from the valve 66. The flowmeter 68 is of the type that generates an electrical current functionally related to the flow of titrant through line 36. Electrical power for the flowmeter 68 is supplied by D.C. power supply 70. The output from flowmeter 68 is fed through conducting lines 72 and 74 to recorder 76.

Recorder 76 is mechanically connected (as indicated by the broken line) to the motor control 78. Motor control 78 controls the position of a valve 80 located in the fresh chemical line 82.

On the basis of the fraction titrated, the two half-cells 20 and 22 follow the titration curve 10. (See FIG. 1.) $P_1$ and $P_2$ represent the control positions for the voltage interval $\Delta E$. The ratio of the fractions titrated is fixed by the geometry of the capillaries 33, 35, 42 and 44. If $s_1$ and $s_2$ are the sample flow rates in half-cells 20 and 22, $r_1$ and $r_2$ are the corresponding rates for the titrant, then capillary constants $A_s$ and $A_r$ may be defined by $$A_s = \frac{s_1}{s_2} \text{ and } A_r = \frac{r_1}{r_2}$$

The fractions titrated are $$X_1 = \frac{r_1 c_r}{s_1 c_s} \text{ and } X_2 = \frac{r_2 c_r}{s_2 c_s}$$

where $c_r$ and $c_s$ are concentrations in equivalents per unit volume, and the ratio of these fractions is $$\frac{X_1}{X_2} = \frac{A_r}{A_s}$$

The automatic system will maintain a control interval for which $$\frac{\Delta E}{\Delta X} = \frac{\Delta E}{X_1[(A_s/A_r)-1]}$$

When $\Delta X$ is small, the fraction titrated is given implicitly by $$XE'(X) = \frac{\Delta E}{(A_s/A_r)-1}$$

where $E'(X)$ is the derivative of the titration curve. For practical purposes, the total reagent flow rate, $r_1+r_2$, is directly proportional to $c_s$ if $s_1+s_2$, $c_r$, and $\Delta E$ are constant, and the function $E'(X)$ is not very dependent on $c_s$.

Defining X by $$X = \frac{(r_1+r_2)c_r}{(s_1+s_2)c_s}$$

and combining with the equation $$XE'(X) = \frac{\Delta E}{(A_s/A_r)-1}$$

we have $$r_1+r_2 = \frac{\Delta E(s_1+s_2)}{[(A_s/A_r)-1]E'(X)c_r} \cdot c_s \quad (1)$$

Under a given set of operating conditions, $c_s$ is the only variable on the right side of Equation 1. Then the total reagent flow rate, $r_1+r_2$, is proportional to $c_s$.

$$r_1+r_2 = Kc_s$$

where K is a constant.

Since the total flow rate, $r_1+r_2$, is indicated by flowmeter 68, it is the output of the flowmeter which will be directly related to $c_s$. The rate $r_1+r_2$ is also related, of course, to the position of valve 66.

By the proper choice of resistor 52, the current through resistor 52 and resistor 54 from the battery 50 is adjusted such that the position of sliding contact 56 provides a direct reading of the control voltage in millivolts. Under normal operating conditions, the control voltage will be equal and opposite to the potential developed across electrodes 24 and 26. Any difference which develops is detected by the recorder 60 which then operates motor control 64 to make an appropriate adjustment of the titrant flow rate to return the unbalanced signal to zero. The control voltage is chosen so as to lie on the shoulder of the titration curve.

The flowmeter 68 is an electrical flowmeter suitable for measuring liquid flow in the range of about 0–100 cc./min. (See FIG. 3.) The heated resistors 84, 86, 88 and 90 are resistors with a high temperature coefficient of resistance which form the arms of a bridge. Resistors 84 and 88 are mounted on the titrant flow line 36. Resistors 86 and 90 are mounted on branch line 37 through which no flow occurs under normal operating conditions. The bridge unbalance is related to the rate at which heat is conducted away from resistors 84 and 88 by the flowing solution. Changes in potential across lines 72 and 74 cause the recorder 76 to operate the motor control 78.

Motor control 78 includes a reversible motor. The reversible motor turns the valve 80 in a direction depending upon whether motor coil 102 or 104 is energized. This direction is determined by closing of the relay switch 106 at either relay switch contact 108 or relay switch contact 110 which in turn depends on the relative currents through relay coils 112 and 114. If coil 112 passes the larger current, contact 108 is closed; a larger current through coil 114 will close contact 110.

The currents through coil 112 and coil 114 are determined by the positions of slide wire 116 on resistor 118 and slide wire 120 on resistor 122. Slide wire 116 is mechanically coupled to recorder 76 and moves away from its neutral position when the titrant flow rate deviates from the setpoint which has been selected to correspond to the desired sample concentration.

As the motor turns, it moves the contact 120 as well as the valve 80. The effects of slide wires 116 and 120 oppose one another in the relay circuit. Thus, the angle through which the water must turn to cancel a voltage increment from slide wire 116 is proportional to the signal which actuates slide wire 116. As the flow of fresh chemical through line 82 compensates the concentration change of the process stream, the signal from the flowmeter 68 diminishes; slide wire 116 follows this change with the result that the opposite relay contact closes, and slide wire 120 and valve 80 move back accordingly.

The electrical structure of motor control 64 is substantially the same as the electrical structure of motor control 78.

In summary, the potential developed between electrodes 24 and 26 will be substantially the same in magnitude as the control voltage as long as the fresh chemical requirement of the sample remains unchanged. However, when the fresh chemical concentration changes, the potential across electrodes 24 and 26 will also change. This change is detected by recorder 60 and motor control 64 operated to adjust valve 66 controlling the flow of titrant. The change in flow of titrant is detected by flowmeter 68 which in turn actuates recorder 76. Recorder 76 operates motor control 78 to adjust valve 80. The flow of fresh chemical through line 82 is thereby controlled to return the fresh chemical concentration in the process stream flowing through line 30 to the desired concentration.

I claim:

1. A continuous automatic process control system comprising: a chemical line for flowing chemicals to the process; a titration cell including a first half-cell and a second half-cell; a first electrode and a second electrode in said first half-cell and said second half-cell, respectively; a first conduit having a first branch line for continuously flowing a portion of a sample of the process stream to said first half-cell and a second branch line for flowing the remainder of said sample to said second half-cell; a second conduit having a first branch line for continuously flowing a portion of a titrant to said first half-cell and a second branch line for flowing the remainder of said titrant to said second half-cell, at least one of said four branch lines having at least a portion thereof of less diameter than the other lines so as to provide a ratio of sample to titrant in the first half-cell different from the ratio of sample to titrant in the second half-cell so that a potential difference is developed across said electrodes; an electrical circuit including said electrodes and a predetermined voltage, said electrical circuit providing means for continuously comparing the potential difference developed across said electrodes with the predetermined voltage and for the flow of electrical current when the potential differs from the predetermined voltage; a motor controlled valve in the second conduit responsive to the current flow in said electrical circuit for controlling the total amount of titrant flowed to the titration cell; a flowmeter connected to the second conduit; a valve in the chemical line; and a motor control mechanically connected to the valve and electrically connected to the flowmeter, said motor control being actuated by the flowmeter in response to changes in said total flow to adjust the valve to control the amount of fresh chemical added to the process stream.

2. A continuous automatic process control system comprising: a chemical line for flowing chemicals to the process; a titration cell including a first half-cell and a second half-cell; a first electrode and a second electrode in said first half-cell and said second half-cell, respectively; a first sample line leading to said first half-cell and a second sample line leading to said second half-cell, each of said two sample lines being provided with a capillary, with the capillaries having the same diameter; a conduit having a first branch line for continuously flowing a portion of a titrant to said first half-cell and a second branch line for flowing the remainder of said titrant to said second half-cell, each of said branch lines being provided with a capillary, with the capillary in one branch line having a diameter different from the diameter of the capillary in the other branch line so that a potential difference is developed across said electrodes; an electrical circuit including said electrodes and a predetermined voltage, said electrical circuit providing means for continuously comparing the potential difference developed across said electrodes with the predetermined voltage and for the flow of electrical current when the potential differs from the predetermined voltage; a motor controlled valve in the second conduit responsive to the current flow in said electrical circuit for controlling the total amount of titrant flowed to the titration cell; a flowmeter connected to the conduit; a valve in the chemical line; and a motor control mechanically connected to the valve and electrically connected to the flowmeter, said motor control being actuated by the flowmeter in response to changes in said total flow to adjust the valve to control the amount of fresh chemical added to the process stream.

3. In combination: a titration cell including a first half-cell and a second half-cell; a first electrode and a second electrode in said first half-cell and said second half-cell, respectively; a first conduit having a first branch line for continuously flowing a portion of a sample of the process stream to said first half-cell and a second branch line for flowing the remainder of said sample to said second half-cell; a second conduit having a first branch line for continuously flowing a portion of a titrant to said first half-cell and a second branch line for flowing the remainder of said titrant to said second half-cell, at least one of said four branch lines having at least a portion thereof of less diameter than the other lines so as to provide a ratio of sample to titrant in the first half-cell different from the ratio of sample to titrant in the second half-cell so that a potential difference is developed across said electrodes; an electrical circuit including said electrodes and a predetermined voltage, said electrical circuit providing means for continuously comparing the potential difference developed across said electrodes with the predetermined voltage and for the flow of electrical current when the potential differs from the predetermined voltage; a motor controlled valve in the second conduit responsive to the current flow in said electrical circuit for controlling the total amount of titrant flowed to the titration cell.

4. A continuous automatic process control method for controlling the addition of fresh chemical to the process stream comprising the steps of: potentiometrically titrating two sample portions from the process stream, the ratio of titrant to sample in the first portion being more than the ratio of titrant to sample in the second portion; applying a control voltage across the electrodes used to titrate the two sample portions so as to provide potentials to said electrodes lying on the shoulder of the titration curve; electrically sensing any variation of the titration potential from the control voltage; transmitting an error signal; adjusting the titrant flow to correct for said variation and render the titration potential and control voltage equal; and adding fresh chemical to the process stream in response to changes in the total amount of sample and titrant.

References Cited by the Examiner

UNITED STATES PATENTS

| | | | |
|---|---|---|---|
| 1,684,645 | 8/28 | Smith et al. | 23—230 |
| 1,944,803 | 1/34 | Ornstein | 137—88 |
| 2,345,465 | 3/44 | Miles et al. | 23—253 X |
| 2,396,934 | 3/46 | Wallace | 137—88 X |
| 2,977,199 | 3/61 | Quittner | 23—230 |

MORRIS O. WOLK, *Primary Examiner.*

GEORGE D. MITCHELL, JAMES H. TAYMAN, JR.,
*Examiners.*